(12) United States Patent
Sato et al.

(10) Patent No.: US 8,664,338 B2
(45) Date of Patent: Mar. 4, 2014

(54) PROCESSABILITY IMPROVER FOR FOAM MOLDING AND VINYL CHLORIDE RESIN COMPOSITION CONTAINING SAME

(75) Inventors: Mitsutaka Sato, Takasago (JP);
Hideyuki Sakamoto, Takasago (JP);
Hiroomi Tokimoto, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/375,652

(22) PCT Filed: May 25, 2010

(86) PCT No.: PCT/JP2010/003498
§ 371 (c)(1),
(2), (4) Date: Feb. 23, 2012

(87) PCT Pub. No.: WO2010/140317
PCT Pub. Date: Dec. 9, 2010

(65) Prior Publication Data
US 2012/0142796 A1    Jun. 7, 2012

(30) Foreign Application Priority Data
Jun. 1, 2009  (JP) ................ 2009-132232

(51) Int. Cl.
*C08J 9/06*     (2006.01)
*C08F 265/06*   (2006.01)
*C08L 27/06*    (2006.01)
*C08L 33/00*    (2006.01)

(52) U.S. Cl.
USPC .......................................... 525/221; 525/222

(58) Field of Classification Search
USPC ................................................ 525/221, 222
See application file for complete search history.

(56) References Cited

U.S. PATENT DOCUMENTS

| | | | | |
|---|---|---|---|---|
| 5,849,848 A | * | 12/1998 | Kosaka et al. | ........... 525/221 |
| 7,385,007 B2 | * | 6/2008 | Moroishi et al. | ........... 525/192 |
| 2008/0255295 A1 | * | 10/2008 | Fraser et al. | ........... 524/522 |
| 2009/0280322 A1 | * | 11/2009 | Daniels et al. | ........... 428/354 |

FOREIGN PATENT DOCUMENTS

| | | |
|---|---|---|
| EP | 1 045 004 A1 | 10/2000 |
| EP | 1 167 445 A2 | 1/2002 |
| JP | 50-123761 A | 9/1975 |
| JP | 60-258241 A | 12/1985 |
| JP | 1-215846 A | 8/1989 |
| JP | 10-017626 A | 1/1998 |
| JP | 10-036606 A | 2/1998 |
| JP | 2005-255717 A | 9/2005 |
| JP | 2006-282901 A | 10/2006 |
| JP | 3892225 B2 | 3/2007 |

OTHER PUBLICATIONS

International Search Report of PCT/JP2010/003498, mailing date Jul. 13, 2010.
International Preliminary Report on Patentability dated Dec. 12, 2011, issued in corresponding International Application No. PCT/JP2010/003498 (form PCT/IB/373 and Form PCT/ISA/237).
Extended European Search Report dated Jan. 24, 2013, issued in corresponding European Patent Application No. 10783105.9 (4 pages).

* cited by examiner

*Primary Examiner* — Nathan M Nutter
(74) *Attorney, Agent, or Firm* — Westerman, Hattori, Daniels & Adrian, LLP

(57) ABSTRACT

An object of the present invention is to provide a foaming vinyl chloride resin composition having excellent foaming properties and providing a foam molded product with an excellent appearance by enhancing the melt strength of the vinyl chloride resin composition. A processability improver for foam molding according to the present invention includes a (meth)acrylic polymer powder with a weight average molecular weight of 2,000,000 to 7,000,000, wherein the (meth)acrylic polymer powder includes 1 to 20% by weight of a (meth)acrylic polymer (A) with a weight average molecular weight of 10,000 to 300,000, and 80 to 99% by weight of a (meth)acrylic polymer (B) with a weight average molecular weight of 2,000,000 to 7,000,000.

11 Claims, No Drawings

PROCESSABILITY IMPROVER FOR FOAM MOLDING AND VINYL CHLORIDE RESIN COMPOSITION CONTAINING SAME

TECHNICAL FIELD

The present invention relates to a processability improver for foam molding and a foaming vinyl chloride resin composition containing the improver.

BACKGROUND ART

Vinyl chloride resins are widely used for molding materials and the like based on their characteristics, but have various processing problems such that the thermal decomposition temperature is close to a processing temperature, therefore the processing condition is limited, and fluidity is poor. However, it is known that blending a high-molecular-weight (meth)acrylic polymer powder having methyl methacrylate as a principal component promotes gelling of a vinyl chloride resin in molding process, and improves the appearance of a molded product, leading to application to vacuum molding and profile extrusion molding.

In contrast, foaming is one of the methods of molding a vinyl chloride resin, and an attempt of adopting this molding method is made to reduce the weight of the vinyl chloride resin and use the product as a wood substitute material. However, in the case that a high-molecular-weight (meth)acrylic polymer powder is added to a vinyl chloride resin to produce a foam molded product, the production is problematic in that the melt elongation and melt strength of the vinyl chloride resin are insufficient, and therefore a foam molded product insufficiently foams and foaming cells are ununiform. In addition, the vinyl chloride resin has a limited molding condition. Therefore, it is difficult to produce a foam molded product having excellent appearance and a sufficient expansion ratio only by changing the processing conditions.

In order to overcome these disadvantages, various methods have been proposed for providing a vinyl chloride resin having a sufficient expansion ratio without impairing the appearance. The methods comprise blending a (meth)acrylic polymer powder having an ultrahigh-molecular-weight methyl methacrylate as a principal component so as to impart good melt strength (see, for example, Patent Documents 1 to 3). These methods provide a vinyl chloride foam molded product having a high expansion ratio without impairing the appearance of a foam molded product.

However, when such an ultrahigh-molecular-weight (meth)acrylic polymer powder is added to a vinyl chloride resin, a (meth)acrylic polymer is insufficiently dispersed in a vinyl chloride resin, problematically leading to insufficient improvement in melt strength. In addition, a large cell size and contraction of a foam molded product occur, and they problematically result in poor appearance of the foam molded product.

Patent Document 1: JP-B 3892225
Patent Document 2: JP-A 2005-255717
Patent Document 3: JP-A 2006-282901

SUMMARY OF THE INVENTION

It is an object of the present invention to provide a foaming vinyl chloride resin composition having excellent foaming properties and providing a foam molded product with an excellent appearance by enhancing the melt strength of the vinyl chloride resin composition.

As a result of earnest investigations on the problems, the present inventors have found that a specific (meth)acrylic polymer powder and a vinyl chloride resin composition containing the powder specifically exert effects in solving the problems, leading to completion of the present invention.

That is, the present invention relates to a processability improver for foam molding, comprising: a (meth)acrylic polymer powder with a weight average molecular weight of 2,000,000 to 7,000,000, wherein the (meth)acrylic polymer powder comprises 1 to 20% by weight of a (meth)acrylic polymer (A) with a weight average molecular weight of 10,000 to 300,000, and 80 to 99% by weight of a (meth)acrylic polymer (B) with a weight average molecular weight of 2,000,000 to 7,000,000.

A preferable embodiment is the processability improver for foam molding, wherein the primary particle has a multilayer structure, and comprises an inner layer containing the (meth)acrylic polymer (A) and an outer layer containing the (meth)acrylic polymer (B).

A preferable embodiment is the processability improver for foam molding, wherein the (meth)acrylic polymer is obtained by emulsion polymerization of 75 to 100% by weight of methyl methacrylate, 0 to 25% by weight of a (meth)acrylic ester other than the methyl methacrylate, and 0 to 5% by weight of other monomers copolymerizable with the methyl methacrylate and the (meth)acrylic ester.

A preferable embodiment is the processability improver for foam molding, wherein the (meth)acrylic polymer (B) is obtained by emulsion polymerization of a monomer mixture (B), the monomer mixture (B) comprising 75 to 100% by weight of methyl methacrylate, 0 to 25% by weight of a (meth)acrylic ester other than the methyl methacrylate, and 0 to 5% by weight of other monomers copolymerizable with the methyl methacrylate and the (meth)acrylic ester.

A preferable embodiment is the processability improver for foam molding, wherein the (meth)acrylic polymer (B) is obtained by emulsion polymerization of a monomer mixture (B), the monomer mixture (B) comprising 75 to 99.999999% by weight of methyl methacrylate, 0 to 25% by weight of a (meth)acrylic ester other than the methyl methacrylate, and 0.000001 to 0.01% by weight (0.01 to 100 ppm by weight) of a multifunctional monomer.

A preferable embodiment is the processability improver for foam molding, wherein the (meth)acrylic polymer (A) is obtained by emulsion polymerization of a monomer mixture (A), the monomer mixture (A) comprising 10 to 100% by weight of methyl methacrylate, 0 to 90% by weight of a (meth)acrylic ester other than the methyl methacrylate, and 0 to 5% by weight of other monomers copolymerizable with the methyl methacrylate and the (meth)acrylic ester.

A preferable embodiment is the processability improver for foam molding, which is obtained by emulsion polymerization of 80 to 99 parts by weight of the monomer mixture (B) in the presence of a latex of the (meth)acrylic polymer (A) obtained by emulsion polymerization of 1 to 20 parts by weight of the monomer mixture (A).

A preferable embodiment is the processability improver for foam molding, wherein an emulsifier to be used in the emulsion polymerization is one or more salts selected from the group consisting of alkylbenzene sulfonates, alkyldiphenyl ether disulfonates, and alkyl sarcosinates.

A preferable embodiment is the processability improver for foam molding, further comprising 0.2 to 4.0% by weight of the emulsifier based on 100% by weight of the processability improver for foam molding.

A preferable embodiment is the processability improver for foam molding, wherein the (meth)acrylic polymer powder has a volume average particle diameter of 50 to 300 μm, and a particle in the powder is a porous aggregate formed by fusion sticking of primary particles having a volume average primary particle diameter of 0.12 to 0.70 μm in an immature-melt state at a position contacting with each other.

A preferable embodiment is the processability improver for foam molding, wherein the (meth)acrylic polymer powder is obtained by spray-drying a polymer latex obtained by the emulsion polymerization.

The present invention also relates to a vinyl chloride resin composition, comprising: 100 parts by weight of a vinyl chloride resin; and 1 to 30 parts by weight of the processability improver for foam molding.

The vinyl chloride resin composition of the present invention containing a (meth)acrylic copolymer powder provides a foaming vinyl chloride resin composition having excellent foaming properties and providing a foam molded product with an excellent appearance by enhancing the melt strength of the vinyl chloride resin composition.

MODES FOR CARRYING OUT THE INVENTION (Processability Improver for Foam Molding)

The principal component of the processability improver for foam molding according to the present invention is a (meth)acrylic polymer powder, and preferably a powder produced by spray-drying a latex containing the (meth)acrylic polymer obtained by emulsion polymerization. Since the latex obtained by the emulsion polymerization is directly spray dried, the processability improver for foam molding according to the present invention, in an assumed total amount of 100% by weight, contains an emulsifier in an amount of preferably 0.2 to 4.0% by weight, more preferably 0.3 to 3.0% by weight, and further preferably 0.5 to 2.5% by weight. In most cases, the emulsifier is contained in each particle of the powder. Unless otherwise specified, the term "(meth)acrylic" used herein refers to acrylic, methacrylic or both.

((Meth)Acrylic Polymer Powder)

The (meth)acrylic polymer powder according to the present invention has a weight average molecular weight of 2,000,000 to 7,000,000, and the (meth)acrylic polymer powder includes 1 to 20% by weight of a (meth)acrylic polymer (A) with a weight average molecular weight of 10,000 to 300,000, and 80 to 99% by weight of a (meth)acrylic polymer (B) with a weight average molecular weight of 2,000,000 to 7,000,000.

The volume average particle diameter of such a (meth)acrylic polymer powder according to the present invention is 50 to 300 μm when the respective particles of the powder, that is, powder particles, are measured by a laser diffraction scattering method. In order to make the classification with a polyvinyl chloride resin (usually a powder) more difficult, the volume average particle diameter is preferably 70 to 250 μm. With respect to the particle diameter distribution of this powder, the amount of particles having a diameter of 10 μm or less is preferably small in terms of workability and prevention of dust explosion. Such a laser diffraction scattering method may be performed by using MICROTRAC MT3300II (registered trademark) produced by Nikkiso Co., Ltd., for example.

The particles of the (meth)acrylic polymer powder according to the present invention is preferably a porous aggregate formed by fusion sticking of primary particles having a volume average primary particle diameter of 0.12 to 0.70 μm in an immature-melt state at a position contacting with each other. The volume average primary particle diameter is more preferably 0.15 to 0.40 μm, and further preferably 0.16 to 0.35 μm.

The volume average primary particle diameter is a volume average primary particle diameter of primary particles in the particles of the (meth)acrylic polymer powder according to the present invention, and is preferably the same as the particle diameter in the latex containing the (meth)acrylic polymer obtained by emulsion polymerization as described above. The particle diameter in such a latex can be determined by a dynamic light scattering method. Such a dynamic light scattering method may be performed by using, for example, MICROTRAC UPA150 (produced by Nikkiso Co., Ltd.).

If the volume average primary particle diameter is less than 0.12 μm, the primary particles in the powder particles preferably formed by spray-drying, as described above, and the surfaces of the powder particles are likely to fuse with one another, and gelling promotion property which the (meth)acrylic polymer powder inherently has may be impaired.

It can be observed with an optical microscope whether or not the primary particles in the powder particles, and the surfaces of the powder particles fuse with one another. If they do not fuse, the entire powder particles are white; as the fusion proceeds, the color changes into a transparent color. Alternatively, the fusion state of primary particles can be directly observed with a scanning electron microscope.

In contrast, in the case where the volume average primary particle diameter exceeds 0.70 μm, upon molding the composition containing the processability improver for foam molding according to the present invention, the (meth)acrylic polymer according to the present invention is not uniformly molecularly dispersed in the composition, and fish eyes (F.E.) may occur in a molded product or gelling promotion may be insufficient.

The (meth)acrylic polymer according to the present invention is preferably obtained by emulsion polymerization of 75 to 100% by weight of methyl methacrylate, 0 to 25% by weight of a (meth)acrylic ester other than the methyl methacrylate, and 0 to 5% by weight of other monomers copolymerizable with the methyl methacrylate and the (meth)acrylic ester, and is more preferably obtained by spray-drying a polymer latex obtained by the emulsion polymerization.

As described above, the (meth)acrylic polymer powder according to the present invention is a (meth)acrylic polymer powder having a weight average molecular weight of 2,000,000 to 7,000,000. The weight average molecular weight used herein is a value of a polymer dissolved in tetrahydrofuran (THF) and determined by gel permeation chromatograph (GPC) based on polystyrene standard. In this case, the weight average molecular weight is a value of the powder dissolved in THF and measured.

As described above, the (meth)acrylic polymer needs to have a weight average molecular weight of 2,000,000 to 7,000,000, and preferably has a weight average molecular weight of 3,000,000 to 7,000,000, more preferably 4,000,000 to 7,000,000, and particularly preferably 5,000,000 to 7,000,000. If the polymer has a weight average molecular weight of less than 2,000,000, the specific gravity of the molded product of the composition containing the processability improver for foam molding according to the present invention may be insufficiently low or gelling properties may be impaired. In contrast, when the molecular weight exceeds 7,000,000, the surface quality of the molded product of the composition containing the processability improver for foam molding according to the present invention may deteriorate or gelling properties may be impaired.

The amount of the methyl methacrylate in the (meth) acrylic polymer is preferably 75 to 100% by weight, more preferably 80 to 99% by weight, particularly preferably 81 to 98% by weight, and most preferably 85 to 97% by weight in order to achieve a sufficiently low specific gravity of the vinyl chloride resin molded product containing the (meth)acrylic polymer powder of the present invention and good gelling properties.

The amount of the (meth)acrylic ester other than the methyl methacrylate in the (meth)acrylic polymer is preferably 0 to 25% by weight, more preferably 1 to 20% by weight, particularly preferably 2 to 19% by weight, and most preferably 3 to 15% by weight, in order to achieve a sufficiently low specific gravity of the vinyl chloride resin molded product containing the (meth)acrylic polymer powder of the present invention and good gelling properties.

The amount of other copolymerizable monomers in the (meth)acrylic polymer is preferably 0 to 5% by weight, and more preferably 0 to 2% by weight, in order to achieve a sufficiently low specific gravity of the vinyl chloride resin molded product containing the (meth)acrylic polymer powder of the present invention and good gelling properties.

((Meth)Acrylic Polymer (A))

The (meth)acrylic polymer (A) has a weight average molecular weight of 10,000 to 300,000, and is preferably obtained by emulsion polymerization of a monomer mixture (A), which includes 10 to 100% by weight of methyl methacrylate, 0 to 90% by weight of a (meth)acrylic ester other than the methyl methacrylate, and 0 to 5% by weight of other monomers copolymerizable with the methyl methacrylate and the (meth)acrylic ester.

The polymer (A) needs to have a weight average molecular weight of 10,000 to 300,000, and preferably has a weight average molecular weight of 20,000 to 250,000, more preferably 20,000 to 200,000, further preferably 20,000 to 100,000, and particularly preferably 20,000 to 50,000.

In order to control the molecular weight of the polymer (A) within the above range, the polymerization may be performed in the presence of a chain transfer agent. The amount of the chain transfer agent for polymerization is preferably 0.1 to 5 parts by weight, more preferably 0.4 to 3 parts by weight, further preferably 0.5 to 2.5 parts by weight, and particularly preferably 0.7 to 2 parts by weight, relative to 100 parts by weight of the monomer mixture (A).

If the polymer (A) has a weight average molecular weight of less than 10,000, the surface quality of the molded product of the composition containing the processability improver for foam molding according to the present invention may deteriorate (e.g. a polymer (A) component may plate out upon foam extrusion molding). In contrast, if the polymer (A) has a weight average molecular weight of more than 300,000, the surface quality of the molded product of the composition containing the processability improver for foam molding according to the present invention may deteriorate or gelling properties may be impaired.

The amount of the methyl methacrylate in the monomer mixture (A) is preferably 10 to 100% by weight, more preferably 30 to 95% by weight, further preferably 40 to 90% by weight, particularly preferably 40 to 70% by weight, and most preferably 40 to 60% by weight. If the amount of the methyl methacrylate in the monomer mixture (A) is less than 10% by weight, the effect of improving the surface quality of the vinyl chloride resin molded product containing the (meth) acrylic polymer powder of the present invention may be insufficient or gelling properties may be impaired.

The amount of the (meth)acrylic ester other than the methyl methacrylate in the monomer mixture (A) is preferably 0 to 90% by weight, more preferably 5 to 70% by weight, further preferably 10 to 60% by weight, particularly preferably 30 to 60% by weight, and most preferably 40 to 60% by weight. If the amount of the (meth)acrylic ester other than the methyl methacrylate in the monomer mixture (A) is less than 10% by weight, the effect of improving the surface quality of the vinyl chloride resin molded product containing the processability improver for foam molding according to the present invention may be insufficient or gelling properties may be impaired.

In order to soften the (meth)acrylic polymer (A) and thus make it easier to disperse the processability improver for foam molding according to the present invention in a resin composition in foaming, the (meth)acrylic ester other than the methyl methacrylate in the monomer mixture (A) is preferably one or more selected from the group consisting of ethyl acrylate, propyl acrylate, butyl acrylate (BA), 2-ethylhexyl acrylate, octyl acrylate, ethyl methacrylate, propyl methacrylate, and butyl methacrylate, more preferably one or more selected from the group consisting of BA, 2-ethylhexyl acrylate, octyl acrylate, and butyl methacrylate, and further preferably BA.

The amount of other copolymerizable monomers in the monomer mixture (A) is preferably 0 to 5% by weight, and more preferably 0 to 2% by weight. If the amount of other copolymerizable monomers is outside the range, the specific gravity of the product obtained by blending the (meth)acrylic polymer powder of the present invention in the vinyl chloride resin may be insufficiently low or gelling properties may be impaired. The specific gravity of the molded product of the composition containing the processability improver for foam molding is preferably as low as possible, provided that the practical strength of an element is not low, since the weight of the element can be reduced, thus making it easier to handle the element. In addition, the molded product is advantageous in cost.

((Meth)Acrylic Polymer (B))

The weight average molecular weight of the (meth)acrylic polymer (B) according to the present invention is 2,000,000 to 7,000,000. The weight average molecular weight is more preferably 3,000,000 to 7,000,000, and more preferably 5,000,000 to 7,000,000, in order to produce a foamed body having a smaller specific gravity.

In order to control the molecular weight of the polymer (B) within the above range, the polymerization may be performed in the presence of a chain transfer agent. The amount of the chain transfer agent for polymerization is preferably 200 ppm by weight or less, more preferably 100 ppm by weight or less, further preferably 50 ppm by weight or less, and particularly preferably 1 ppm by weight or less, relative to 100 ppm by weight of the monomer mixture (B). It is most preferable not to use the chain transfer agent.

The (meth)acrylic polymer (B) according to the present invention is preferably obtained by emulsion polymerization of a monomer mixture (B), which includes 75 to 100% by weight of methyl methacrylate, 0 to 25% by weight of a (meth)acrylic ester other than the methyl methacrylate, and 0 to 5% by weight of other monomers copolymerizable with the methyl methacrylate and the (meth)acrylic ester.

The amount of the methyl methacrylate in the monomer mixture (B) is preferably 75 to 100% by weight, more preferably 75 to 99.999999% by weight, further preferably 80 to 99% by weight, particularly preferably 85 to 98% by weight, and most preferably 90 to 95% by weight. When the amount of the methyl methacrylate in the monomer mixture (B) is less than 75% by weight, the specific gravity of the vinyl chloride resin molded product containing the (meth)acrylic polymer powder of the present invention may be insufficiently low or gelling properties may be impaired.

The amount of the (meth)acrylic ester other than the methyl methacrylate in the monomer mixture (B) is preferably 0 to 25% by weight, more preferably 1 to 20% by weight, further preferably 2 to 15% by weight, and particularly preferably 5 to 10% by weight. If the amount of the (meth)acrylic ester other than the methyl methacrylate in the monomer mixture (B) exceeds 25% by weight, the foamability of the vinyl chloride resin molded product containing the (meth)acrylic polymer powder of the present invention may be insufficient, and thus the specific gravity thereof may be insufficiently low or gelling properties may be impaired.

The amount of the other copolymerizable monomers in the monomer mixture (B) is preferably 0 to 5% by weight, and more preferably 0 to 2% by weight. If the amount of the other copolymerizable monomers is outside the range, the specific gravity of the vinyl chloride resin molded product containing the (meth)acrylic polymer powder of the present invention may be insufficiently low or gelling properties may be impaired.

In order to provide a foam with a smaller specific gravity, the monomer mixture (B) in an amount of 100% by weight includes preferably 0.000001 to 0.01% by weight (0.01 to 100 ppm by weight), more preferably 0.1 to 10 ppm by weight, further preferably 0.2 to 10 ppm by weight, and particularly preferably 0.5 to 2 ppm by weight, of a multifunctional monomer as a copolymerizable monomer.

((Meth)Acrylic Polymer)

As described above, the (meth)acrylic polymer according to the present invention includes 1 to 20% by weight of the (meth)acrylic polymer (A) with a weight average molecular weight of 10,000 to 300,000, and 80 to 99% by weight of the (meth)acrylic polymer (B) with a weight average molecular weight of 2,000,000 to 7,000,000. The (meth)acrylic polymer preferably includes a (meth)acrylic polymer (A) obtained by polymerization of 1 to 20% by weight of the monomer mixture (A) and 80 to 99% by weight of a (meth)acrylic polymer (B) obtained by polymerization of the monomer mixture (B) (provided that the total amount of the monomer mixture (A) and monomer mixture (B) is 100 parts by weight).

More preferably, the (meth)acrylic polymer of the present invention is obtained by emulsion polymerization of 80 to 99 parts by weight of the monomer mixture (B) in the presence of a latex of the (meth)acrylic polymer (A) obtained by emulsion polymerization of 1 to 20 parts by weight of the monomer mixture (A). When the such a polymerization is carried out, the primary particle has a multilayer structure, and includes an inner layer containing the (meth)acrylic polymer (A) and an outer layer containing the (meth)acrylic polymer (B). The primary particle in such a multilayer structure has a low elastic modulus. Therefore, the primary particles easily deform and collapse upon molding, and are likely to evenly disperse in the vinyl chloride resin composition. In this case, the volume average particle diameter of the inner layer is preferably 0.03 to 0.4 μm, and more preferably 0.04 to 0.15 μm.

The amount of the monomer mixture (A) is preferably 1 to 20 parts by weight, more preferably 2 to 18 parts by weight, and particularly preferably 3 to 15 parts by weight. If the amount of the monomer mixture (A) for producing a (meth) acrylic polymer is less than 1 part by weight, the molded product of the surface quality of the vinyl chloride resin composition of the present invention may deteriorate, the specific gravity thereof may be insufficiently low or gelling properties may be impaired. In contrast, when the amount of the monomer mixture (A) exceeds 20 parts by weight, the specific gravity of the molded product of the vinyl chloride resin composition of the present invention may be insufficiently low or gelling properties may be impaired.

In contrast, the amount of the monomer mixture (B) is preferably 80 to 99 parts by weight, more preferably 82 to 98 parts by weight, and particularly preferably 85 to 97 parts by weight. If the amount of the monomer mixture (B) for producing a (meth)acrylic polymer powder is less than 80 parts by weight, the specific gravity of the molded product of the vinyl chloride resin composition of the present invention may be insufficiently low or gelling properties may be impaired. In contrast, if the amount of the monomer mixture (B) exceeds 99 parts by weight, the specific gravity of the molded product of the vinyl chloride resin composition of the present invention may be insufficiently low, the surface quality of the molded product may deteriorate or gelling properties may be impaired.

((Meth)Acrylic Ester Other than Methyl Methacrylate)

The (meth)acrylic ester other than the methyl methacrylate is preferably one or more selected from the group consisting of methacrylic esters having a C2-8 alkyl group excluding methyl methacrylate, and acrylic esters having a C1-8 alkyl group because they have moderate water solubility and are suitable for emulsion polymerization. More specifically, preferable are one or more selected from the group consisting of: methacrylic acid alkyl esters including ethyl methacrylate, propyl methacrylate, n-butyl methacrylate, i-butyl methacrylate, t-butyl methacrylate, 2-ethylhexyl methacrylate, and octyl methacrylate; and acrylic acid alkyl esters including methyl acrylate, ethyl acrylate, propyl acrylate, n-butyl acrylate, t-butyl acrylate, 2-ethylhexyl acrylate, and octyl acrylate. Particularly preferable among these are butyl methacrylate and butyl acrylate in terms of industrial availability.

Examples of the (meth)acrylic ester other than the methyl methacrylate include, in addition to the above acrylic esters, suitable combinations of: methacrylic acid alkyl esters having 9 or more carbon atoms, such as lauryl methacrylate, stearyl methacrylate, and tridecyl methacrylate; acrylic acid alkyl esters having 9 or more carbon atoms, such as lauryl acrylate, stearyl acrylate, and tridecyl acrylate; glycidyl methacrylate; benzyl methacrylate; cyclohexyl methacrylate; 2-hydroxyethyl methacrylate; 4-hydroxybutyl methacrylate; glycidyl acrylate; benzyl acrylate; cyclohexyl acrylate; 2-hydroxyethyl acrylate; and 4-hydroxybutyl acrylate.

(Other Copolymerizable Monomers)

The other copolymerizable monomers are not particularly limited as long as they are monomers copolymerizable with the methyl methacrylate and (meth)acrylic esters other than the methyl methacrylate. Examples thereof include: aromatic vinyl compounds such as styrene, α-methylstyrene, chlorostyrene, vinylstyrene, and nucleus-substituted styrene; unsaturated nitrile compounds such as acrylonitrile and methacrylonitrile; diacrylate compounds such as 1,3-butanediol diacrylate, 1,4-butanediol diacrylate, 1,6-hexanediol diacrylate, nonanediol diacrylate, ethylene glycol diacrylate, propylene glycol diacrylate, polyethylene glycol (2-23) diacrylate, polypropylene glycol (2-12) diacrylate, propoxylated (2-16) neopentyl diacrylate, alkoxylated hexanediol diacrylate, alkoxylated cyclohexane dimethanol diacrylate, ethoxylated (4-30) bisphenol A diacrylate, and tricyclodecane dimethanol diacrylate; dimethacrylate compounds such as 1,3-butanediol dimethacrylate, 1,4-butanediol dimethacrylate, 1,6-hexanediol dimethacrylate, polyethylene glycol (2-23) dimethacrylate, polypropylene glycol (2-12) dimethacrylate, alkoxylated hexanediol dimethacrylate, alkoxylated cyclohexane dimethanol dimethacrylate, ethoxylated (4-30) bisphenol A dimethacrylate, and tricyclodecane dimethanol dimethacrylate; triacrylate compounds such as trimethylolpropane triacrylate, ethoxylated trimethylolpropane triacrylate, propoxylated trimethylolpropane triacrylate, and tris(2-hydroxylethyl)isocyanurate triacrylate; trimethacrylate compounds such as trimethylolpropanetrimethacrylate and trifunctional methacrylate esters; and crosslinking agents such as divinylbenzene (DVB), triallyl isocyanurate (TAIC), allyl methacrylate, dicyclopentadiene, and 2,4,6-trialloxy-1,3,5-triazine(triallyl cyanurate (TAC)). These may be suitably used alone or in combination of two or more species as long as they do not cause practical problems regarding the surface quality, specific gravity, and gelling properties of the molded product in the case of producing the molded product from the (meth) acrylic polymer powder according to the present invention.

In order to produce a foamed body having a smaller specific gravity, the monomer mixture (B), a raw material of the polymer (B) according to the present invention, preferably contains multifunctional monomers. Such multifunctional monomers include preferably one or more selected from the group consisting of polypropylene glycol (2-12) diacrylate, polypropylene glycol (2-12) dimethacrylate, DVB, TRIC, and TAC, and more preferably TAIC because they can give a crosslinked structure preferable in light of the object of the present invention to the processability improver for foam molding according to the present invention.

(Polymerization Method)

The weight average molecular weight can be suitably adjusted depending on the polymerization conditions in preparation of each polymer. Specifically, the weight average molecular weight can be adjusted by the amount of a polymerization initiator (catalyst) in polymerization, the amount of a chain transfer agent in polymerization, the polymerization temperature, the monomer addition speed, and the like.

Specifically, the molecular weight can be increased by decreasing the amount of the polymerization initiator (catalyst), decreasing the amount of the chain transfer agent, lowering the polymerization temperature, or increasing the monomer addition speed. In contrast, the molecular weight can be decreased by increasing the amount of the polymerization initiator (catalyst), increasing the amount of the chain transfer agent, raising the polymerization temperature, or decreasing the monomer addition speed.

The polymerization method for producing the (meth) acrylic polymer according to the present invention is preferably an emulsion polymerization method and a suspension polymerization method, and particularly preferably the emulsion polymerization method, from the viewpoints of easier control of the molecular weight and particle structure, easier industrial production, and easier application to a multistage polymerization method.

If the (meth)acrylic polymer according to the present invention is prepared by the emulsion polymerization method, the kind and amount of an emulsifier, a polymerization initiator, and a chain transfer agent, and the monomer addition speed can be set depending on the target copolymer.

(Emulsifier)

The emulsifier may be a known one such as an anionic surfactant, a nonionic surfactant, and a cationic surfactant. The emulsifier is preferably one or more salts selected from the group consisting of alkylbenzene sulfonates, alkyldiphenyl ether disulfonates, and alkyl sarcosinates, and more preferably linear alkylbenzene sulfonates, from the viewpoints of excellent polymerization stability, thermal stability, and color tone.

As described above, the (meth)acrylic polymer powder according to the present invention is preferably produced by spray-drying the polymer latex obtained by emulsion polymerization. In this case, the emulsifier, the initiator residue, and the like used in the emulsion polymerization remain in the powder, and they may affect the processability in molding the composition containing the processability improver for foam molding according to the present invention, and physical properties of the produced molded product. Therefore, particularly in the case that the (meth)acrylic polymer powder according to the present invention is produced by spray-drying the polymer latex obtained by the emulsion polymerization, the emulsifier to be used in the emulsion polymerization is preferably selected from alkylbenzene sulfonates, alkyldiphenyl ether disulfonates, and alkyl sarcosinates, and more preferably linear alkylbenzene sulfonates, from the viewpoints of physical properties of the molded product such as thermal stability and color tone.

Specific examples of the alkyl benzene sulfonates include sodium decylbenzenesulfonate, sodium undecylbenzenesulfonate, sodium dodecylbenzenesulfonate, sodium tridecylbenzenesulfonate, and sodium tetradecylbenzenesulfonate.

Specific examples of the alkyl diphenyl ether disulfonates include disodium dodecyldiphenyl ether sulfonate.

Specific examples of the alkyl sarcosinates include sodium oleoyl sarcosinate, sodium lauroyl sarcosinate, sodium myristoyl sarcosinate, sodium palmitoyl sarcosinate, and sodium stearoyl sarcosinate.

Examples of the anionic surfactant include fatty acid salts, alkyl sulfates, alkyl benzene sulfonates, alkyl phosphates, dialkyl sulfosuccinates, and alkyl sarcosinates. Examples of the nonionic surfactant include polyoxyethylene alkyl ethers, polyoxyethylene fatty acid esters, and glycerine fatty acid esters. Examples of the cationic surfactant include alkylamine salts.

(Polymerization Initiator)

The polymerization initiator may be a known polymerization initiator such as a water-soluble or oil-soluble polymerization initiator, and a redox polymerization initiator. Examples thereof include an inorganic salt polymerization initiators typified by normal persulfate, organic peroxides, and azo compounds. These may be used alone, or may be used, as a redox polymerization initiator, in combination with a sulfite, a hydrogen sulfite, a thiosulfate, a Group I metal salt, sodiumformaldehyde sulfoxylate, and the like.

Specific examples of the inorganic salt polymerization initiator especially preferable as a polymerization initiator include sodium persulfate, potassium persulfate, and ammonium persulfate. Examples of preferable organic peroxide include t-butyl hydroperoxide, cumene hydroperoxide, t-butyl peroxyisopropylcarbonate, paramenthane hydroperoxide, 1,1,3,3-tetramethyl butyl hydroperoxide, benzoyl peroxide, and lauroyl peroxide.

(Chain Transfer Agent)

The chain transfer agent may be a known one, and preferable examples thereof include alkyl mercaptans having 4 to 12 carbon atoms in the main chain thereof. Specific examples thereof include: alkyl mercaptans such as n-octyl mercaptan, t-octyl mercaptan, n-dodecyl mercaptan, and t-dodecyl mercaptan (t-DM); thioglycols such as 2-ethylhexyl thioglycol and isooctyl thioglycol; alpha-methylstyrene dimer; and terpinolene. The chain transfer agent is preferably one or more species selected from the group consisting of alkyl mercaptans and thioglycols, and more preferably t-DM, in terms of chain transfer efficiency.

(Collection of (Meth)Acrylic Polymer Powder)

As described above, the (meth)acrylic polymer powder according to the present invention is collected from the latex preferably obtained by emulsion polymerization or suspension polymerization.

A usual method of collecting the powder in this case is, for example, a method of collecting a powdery processability improver for foam molding, which includes: adding, to a polymer latex containing the (meth)acrylic polymer to be collected, an electrolyte; thereby acid coagulating or salting out the latex; and thereafter performing treatments including heating, washing, dehydrating, and drying of the latex. Typical examples of the electrolyte include acids such as sulfuric acid, hydrochloric acid, and phosphoric acid; and salts such as sodium chloride, calcium chloride, magnesium chloride, aluminium chloride, sodium sulfate, magnesium sulfate, and aluminium sulfate.

In the present invention, however, it is also preferable to collect the processability improver for foam molding according to the present invention, that is, the (meth)acrylic polymer powder according to the present invention (the principal component of the processability improver) by spray-drying the latex in order to produce a molded product having a low specific gravity and a molded product having an excellent surface gloss upon molding the composition containing the processability improver for foam molding according to the present invention. The conditions of the spray-drying are not particularly limited. The spray-drying is preferably performed under the conditions which do not cause fusion of the inner part and the surface part of a particle and the inner part and the surface part of another particle. This is because if the inner and the surface part of particles, which are aggregates of latex particles left after evaporation of water from the droplets formed by spraying the latex into hot air upon the spray drying, are fused, it causes loss of the gelling promotion property which the (meth)acrylic polymer powder inherently has.

(Vinyl Chloride Resin Composition)

The vinyl chloride resin composition of the present invention contains 100 parts by weight of vinyl chloride resin and 1 to 30 parts by weight of the processability, improver for foam molding according to the present invention. However, the vinyl chloride resin composition may appropriately further contain known additives such as stabilizers, lubricants, impact modifiers, plasticizers, colorants, fillers, and foaming agents as long as they do not impair the effects of the present invention.

In the vinyl chloride resin composition of the present invention, the amount of the (meth)acrylic polymer powder according to the present invention (the principal component of the processability improver of the present invention) is preferably 1 to 30 parts by weight, further preferably 1.5 to 25 parts by weight, and particularly preferably 2 to 20 parts by weight, relative to 100 parts by weight of the vinyl chloride resin. If the amount of the (meth)acrylic polymer powder is less than 1 part by weight, the specific gravity of the molded product obtained from the vinyl chloride resin composition of the present invention may be insufficiently low or the gelling promotion effect may not be exerted upon molding. In contrast, if the amount of the (meth)acrylic polymer powder is more than 30 parts by weight, the surface quality of a vinyl chloride resin molded product may deteriorate or the melt viscosity may increase significantly, producing a large load on a motor of a processing machine.

(Vinyl Chloride Resin)

As the vinyl chloride resin according to the present invention, a conventional vinyl chloride resin may be used without a specific limitation. Specifically, the vinyl chloride resin may be polyvinyl chloride, and preferably a vinyl chloride copolymer consisting of 80% by weight or more of vinyl chloride and 20% by weight or less of monomers copolymerizable with the vinyl chloride, or after-chlorinated polyvinyl chloride. Examples of the monomers copolymerizable with vinyl chloride include vinyl acetate, ethylene, propylene, styrene, vinyl bromide, vinylidene chloride, acrylic esters, and methacrylic esters. These may be used alone or in combination of two or more species.

EXAMPLES

Hereinafter, the present invention will be described more specifically by examples, but is not limited to these examples.

Example 1

Water (140 parts by weight), sodium dodecylbenzenesulfonate (an emulsifier) (0.13 parts by weight), sodium sulfate (0.1 parts by weight), and sodium carbonate (0.05 parts by weight) were mixed, and the reactor was purged with nitrogen at 80° C. Then, potassium persulfate (0.035 parts by weight) was added to the mixture, and subsequently a monomer mixture (A-1-a) containing methyl methacrylate (hereinafter, also referred to as MMA) (63 parts by weight), butyl acrylate (hereinafter, also referred to as BA) (27 parts by weight), and tertiary dodecyl mercaptan (hereinafter, also referred to as t-DM) (0.7 parts by weight) was continuously added thereto under stirring over 300 minutes as part of a monomer mixture (A). After completion of the addition of the monomer mixture (A-1-a), the resultant mixture was stirred for 1 hour for polymerization. Sodium dodecylbenzenesulfonate (0.3 parts by weight for each) was added 1 hour and 2 hours after the start of the continuous addition of the monomer mixture (A-1-a). Further, a monomer mixture (A-1-b) containing MMA (7 parts by weight) and BA (3 parts by weight) was continuously added to the mixture over 30 minutes as the rest of the monomer mixture (A). The resulting mixture was stirred for 1 hour to complete the polymerization reaction, and thereby a latex of a polymer (A-1) was provided as a (meth)acrylic polymer (A). (Meth)acrylic polymer particles in the latex had a volume average particle diameter of 0.092 μm.

Water (140 parts by weight), sodium dodecylbenzenesulfonate (0.6 parts by weight), sodium sulfate (0.1 parts by weight), sodium carbonate (0.05 parts by weight), and the latex of the polymer (A-1) (10 parts by weight, solid content) were mixed, and the reactor was purged with nitrogen at 70° C. Then, potassium persulfate (0.005 parts by weight) was added to the mixture, and subsequently a monomer mixture (B-1) containing MMA (81 parts by weight), BA (9 parts by weight), and tertiary dodecyl mercaptan (0.007 parts by weight) was continuously added thereto under stirring over 30 minutes as a monomer mixture (B). The resulting mixture was stirred for 5 hours to complete the polymerization reaction, and thereby a latex of a (meth)acrylic polymer (1) was provided. (Meth)acrylic polymer particles in the latex had a volume average particle diameter (that is, a volume average primary particle diameter) of 0.211 μm.

This latex was cooled, and spray-dried with an L-12 spray dryer produced by Ohkawara Kakohki Co., Ltd., at an inlet temperature of 110° C. and an outlet temperature of 50° C., whereby a (meth)acrylic polymer powder was produced as a processability improver for foam molding. This (meth)acrylic polymer powder was subjected to the following tests. This processability improver for foam molding contained 0.673% by weight of an emulsifier in a total amount of 100% by weight. Table 1 shows the obtained results with the results of each of the following Examples and Comparative Examples.

(i) Measurement of Molecular Weight

The molecular weight was determined with a system: HLC-8220 produced by TOSOH Corporation, a column: TSKgel Super HZM-H produced by TOSOH Corporation (two pieces); and a solvent: THF. The weight average molecular weight was determined based on polystyrene standard.

(ii) Surface Quality Evaluation Test

The surface quality was evaluated by visual observation of an extrusion sheet. A sample for evaluation was extrusion-molded using a parallel extruder (PolyLab System, produced by Haake) under molding conditions of C1/C2/C3/D:165/170/175/190 (° C.), at a screw speed of 50 rpm and a feeder speed of 140 rpm. The surface quality of the surface of the obtained molded product was determined. This extrusion sheet was observed, and evaluated under five-grade evaluation as follows. In this evaluation, "5" refers to the case where the extrusion sheet had no flow mark or die line on its surface, "4" refers to the case where the extrusion sheet had a few flow marks and/or die lines thereon, "3" refers to the case where the extrusion sheet had flow marks and/or die lines thereon but these were not practically problematic, "2" refers to the case where the extrusion sheet had practically problematic flow marks and/or die lines thereon, and "1" refers to the case where the extrusion sheet had a remarkably large number of flow marks and/or die lines thereon.

The surface quality was evaluated using a vinyl chloride resin composition. The vinyl chloride resin composition was produced by: mixing a polyvinyl chloride resin (Kanevinyl S-1007, produced by Kaneka Corporation) (100 parts by weight) having an average polymerization degree of 700, an octyl tin mercapto-type stabilizer (TVS-8831, produced by Nitto Kasei Co., Ltd.) (1.5 parts by weight), a fatty acid (Loxiol G-21, produced by Cognis) (0.1 parts by weight), a dibasic acid ester (Loxiol G-60, produced by Cognis) (0.9 parts by weight), calcium stearate (SC-100, produced by Sakai Chemical Industry Co., Ltd.) (0.6 parts by weight), oxidized polyethylene wax (ACPE-629A, produced by AlliedSignal) (0.6 parts by weight), calcium carbonate (Hydrocarb 95T, produced by Oma) (6 parts by weight), and titanium oxide (R-62N, produced by Sakai Chemical Industry Co., Ltd.) (2 parts by weight) using a Henschel mixer so as to give a resin temperature of 110° C.; cooling the resultant vinyl chloride resin down to room temperature; and blending, in the resin, the (meth)acrylic polymer powder (15 parts by weight).

(iii) Evaluation of Foamability

Foamability was evaluated by determining the specific gravity of an extrusion sheet. A sample for evaluation was extrusion-molded using a parallel extruder (produced by Haake) under molding conditions of C1/C2/C3/D:165/170/175/190 (° C.), at a screw speed of 50 rpm and a feeder speed of 140 rpm. The specific gravity of the obtained molded product was determined using DENSIMETER-H produced by TOYO SEIKI Co., Ltd.

The foamability was evaluated using a vinyl chloride resin composition obtained by blending 10 parts by weight of the (meth)acrylic polymer powder and 0.6 parts by weight of a foaming agent (SPANGCELL #81 produced by Eiwa Chemical Ind. Co., Ltd.) in the vinyl chloride resin produced as in the surface quality evaluation test.

Example 2

Water (140 parts by weight), sodium dodecylbenzenesulfonate (0.13 parts by weight), sodium sulfate (0.1 parts by weight), and sodium carbonate (0.05 parts by weight) were mixed, and the reactor was purged with nitrogen at 80° C. Then, potassium persulfate (0.035 parts by weight) was added to the mixture, and subsequently a monomer mixture (A-2-a) containing MMA (81 parts by weight), BA (9 parts by weight), and t-DM (0.7 parts by weight) was continuously added thereto under stirring over 300 minutes as part of a monomer mixture (A). After completion of the addition of the monomer mixture (A-2-a), the resultant mixture was stirred for 1 hour for polymerization. Sodium dodecylbenzenesulfonate (0.3 parts by weight for each) was added 1 hour and 3 hours after the start of the continuous addition of the monomer mixture (A-2-a). Further, a monomer mixture (A-2-b) containing MMA (9 parts by weight) and BA (1 part by weight) was continuously added to the mixture over 30 minutes as the rest of the monomer mixture (A). The resulting mixture was stirred for 1 hour to complete the polymerization reaction, and thereby a latex of a polymer (A-2) was provided as a (meth)acrylic polymer (A). (Meth)acrylic polymer particles in the latex had a volume average particle diameter of 0.074 μm.

A latex of a (meth)acrylic polymer (2) was produced as in Example 1, except that the latex of the polymer (A-2) was used instead of the latex of the polymer (A-1) in Example 1. (Meth)acrylic polymer particles in the latex had a volume average particle diameter of 0.172 μm.

Further, a (meth)acrylic polymer powder was produced as in Example 1 using the latex of the (meth)acrylic polymer (2), and subjected to the same tests as in Example 1. This processability improver for foam molding contained 0.673% by weight of an emulsifier in a total amount of 100% by weight.

Example 3

Water (140 parts by weight), sodium dodecylbenzenesulfonate (0.13 parts by weight), sodium sulfate (0.1 parts by weight), and sodium carbonate (0.05 parts by weight) were mixed, and the reactor was purged with nitrogen at 80° C. Then, potassium persulfate (0.035 parts by weight) was added to the mixture, and subsequently a monomer mixture (A-3-a) containing MMA (49.5 parts by weight), BA (40.5 parts by weight), and t-DM (0.7 parts by weight) was continuously added thereto under stirring over 300 minutes as part of a monomer mixture (A). After completion of the addition of the monomer mixture (A-3-a), the resultant mixture was stirred for 1 hour for polymerization. Sodium dodecylbenzenesulfonate (0.3 parts by weight for each) was added 1 hour and 3 hours after the start of the continuous addition of the monomer mixture (A-3-a). Further, a monomer mixture (A-3-b) containing MMA (5.5 parts by weight) and BA (4.5 parts by weight) was continuously added to the mixture over 30 minutes as the rest of the monomer mixture (A). The resulting mixture was stirred for 1 hour to complete the polymerization reaction, and thereby a latex of a polymer (A-3) was provided as a (meth)acrylic polymer (A). (Meth)acrylic polymer particles in the latex had a volume average particle diameter of 0.095 μm.

A latex of a (meth)acrylic polymer (3) was produced as in Example 1, except that the latex of the polymer (A-3) was used instead of the latex of the polymer (A-1) in Example 1. (Meth)acrylic polymer particles in the latex had a volume average particle diameter of 0.215 μm.

Further, a (meth)acrylic polymer powder was produced as in Example 1 using the latex of the (meth)acrylic polymer (3), and subjected to the same tests as in Example 1. This processability improver for foam molding contained 0.673% by weight of an emulsifier in a total amount of 100% by weight.

Example 4

Water (140 parts by weight), sodium dodecylbenzenesulfonate (0.13 parts by weight), sodium sulfate (0.1 parts by weight), and sodium carbonate (0.05 parts by weight) were mixed, and the reactor was purged with nitrogen at 80° C. Then, potassium persulfate (0.035 parts by weight) was added to the mixture, and subsequently a monomer mixture (A-4-a) containing MMA (18 parts by weight), BA (72 parts by weight), and t-DM (0.7 parts by weight) was continuously added thereto under stirring over 300 minutes as part of a monomer mixture (A). After completion of the addition of the monomer mixture (A-4-a), the resultant mixture was stirred for 1 hour for polymerization. Further, a monomer mixture (A-4-b) containing MMA (2 parts by weight) and BA (8 parts by weight) was continuously added to the mixture over 30 minutes as the rest of the monomer mixture (A). The resulting mixture was stirred for 1 hour to complete the polymerization reaction, and thereby a latex of a polymer (A-4) was provided as a (meth)acrylic polymer (A). (Meth)acrylic polymer particles in the latex had a volume average particle diameter of 0.108 μm.

A latex of a (meth)acrylic polymer (4) was produced as in Example 1, except that the latex of the polymer (A-4) was used instead of the latex of the polymer (A-1) in Example 1. (Meth)acrylic polymer particles in the latex had a volume average particle diameter of 0.241 μm.

Further, a (meth)acrylic polymer powder was produced as in Example 1 using the latex of the (meth)acrylic polymer (4), and subjected to the same tests as in Example 1. This processability improver for foam molding contained 0.673% by weight of an emulsifier in a total amount of 100% by weight.

Example 5

A latex of a (meth)acrylic polymer (5) was produced as in Example 1, except that a monomer mixture (B-5) containing MMA (85.5 parts by weight), BA (4.5 parts by weight), and t-DM (0.007 parts by weight) was used as the monomer mixture (B) in Example 1. (Meth)acrylic polymer particles in the latex had a volume average particle diameter of 0.209 μm. Further, a (meth)acrylic polymer powder was produced as in Example 1 using the latex of the (meth)acrylic polymer (5), and subjected to the same tests as in Example 1.

Example 6

A latex of a (meth)acrylic polymer (6) was produced as in Example 1, except that a monomer mixture (B-6) containing MMA (73.8 parts by weight), BA (16.2 parts by weight), and t-DM (0.007 parts by weight) was used as the monomer mixture (B) in Example 1. (Meth)acrylic polymer particles in the latex had a volume average particle diameter of 0.209 μm. Further, a (meth)acrylic polymer powder was produced as in Example 1 using the latex of the (meth)acrylic polymer (6), and subjected to the same tests as in Example 1.

Example 7

A latex of a (meth)acrylic polymer (7) was produced as in Example 1, except that a monomer mixture (B-7) containing MMA (67.5 parts by weight), BA (22.5 parts by weight), and t-DM (0.007 parts by weight) was used as the monomer mixture (B) in Example 1. (Meth)acrylic polymer particles in the latex had a volume average particle diameter of 0.209 μm. Further, a (meth)acrylic polymer powder was produced as in Example 1 using the latex of the (meth)acrylic polymer (7), and subjected to the same tests as in Example 1.

Example 8

A latex of a (meth)acrylic polymer (8) was produced as in Example 1, except that the latex of the polymer (A-1) was produced as in Example 1, then the latex of the polymer (A-1) (5 parts by weight, solid content) was used instead of the latex of the polymer (A-1) (10 parts by weight, solid content) in Example 1, and a monomer mixture (B-8) containing MMA (85.5 parts by weight), BA (9.5 parts by weight), and t-DM (0.0074 parts by weight) was used as the monomer mixture (B) in Example 1. (Meth)acrylic polymer particles in the latex had a volume average particle diameter of 0.269 μm. Further, a (meth)acrylic polymer powder was produced as in Example 1 using the latex of the (meth)acrylic polymer (8), and subjected to the same tests as in Example 1.

Example 9

A latex of a (meth)acrylic polymer (9) was produced as in Example 1, except that the latex of the polymer (A-1) was produced as in Example 1, then the latex of the polymer (A-1) (20 parts by weight, solid content) was used instead of the latex of the polymer (A-1) (10 parts by weight, solid content) in Example 1, and a monomer mixture (B-9) containing MMA (72 parts by weight), BA (8 parts by weight), and t-DM (0.0062 parts by weight) was used as the monomer mixture (B) in Example 1. (Meth)acrylic polymer particles in the latex had a volume average particle diameter of 0.161 μm. Further, a (meth)acrylic polymer powder was produced as in Example 1 using the latex of the (meth)acrylic polymer (9), and subjected to the same tests as in Example 1.

Example 10

A latex of a (meth)acrylic polymer (10) was produced as in Example 1, except that a monomer mixture (A-10-a) containing MMA (63 parts by weight), BA (27 parts by weight), and t-DM (0.4 parts by weight) (only the amount of t-DM was smaller than that in Example 1) was used instead of the monomer mixture (A-1-a) in Example 1. (Meth)acrylic polymer particles in the latex of the polymer (A-10) as the (meth)acrylic polymer (A) had a volume average particle diameter of 0.088 μm. (Meth)acrylic polymer particles in the latex of the (meth)acrylic polymer (10) had a volume average particle diameter of 0.200 μm. Further, a (meth)acrylic polymer powder was produced as in Example 1 using the latex of the (meth)acrylic polymer (10), and subjected to the same tests as in Example 1.

Example 11

A latex of a (meth)acrylic polymer (11) was produced as in Example 1, except that a monomer mixture (A-11-a) containing MMA (63 parts by weight), BA (27 parts by weight), and t-DM (0.2 parts by weight) (only the amount of t-DM was smaller than that in Example 1) was used instead of the monomer mixture (A-1-a) in Example 1. (Meth)acrylic polymer particles in the latex of the polymer (A-11) as the (meth)acrylic polymer (A) had a volume average particle diameter of 0.084 μm. (Meth)acrylic polymer particles in the latex of the (meth)acrylic polymer (11) had a volume average particle diameter of 0.194 μm. Further, a (meth)acrylic polymer powder was produced as in Example 1 using the latex of the (meth)acrylic polymer (11), and subjected to the same tests as in Example 1.

Example 12

A latex of a (meth)acrylic polymer (12) was produced as in Example 1, except that a monomer mixture (B-12) containing MMA (81 parts by weight), BA (9 parts by weight), and t-DM (0.01 parts by weight) (only the amount of t-DM was larger than that in Example 1) was used instead of the monomer mixture (B-1) in Example 1. (Meth)acrylic polymer particles in the latex had a volume average particle diameter of 0.209 µm. Further, a (meth)acrylic polymer powder was produced as in Example 1 using the latex of the (meth)acrylic polymer (12), and subjected to the same tests as in Example 1.

Example 13

A latex of a (meth)acrylic polymer (13) was produced as in Example 1, except that a monomer mixture (B-13) containing MMA (81 parts by weight), BA (9 parts by weight), and t-DM (0.015 parts by weight) (only the amount of t-DM was larger than that in Example 1) was used instead of the monomer mixture (B-1) in Example 1. (Meth)acrylic polymer particles in the latex had a volume average particle diameter of 0.209 µm. Further, a (meth)acrylic polymer powder was produced as in Example 1 using the latex of the (meth)acrylic polymer (13), and subjected to the same tests as in Example 1.

Example 14

A latex of a (meth)acrylic polymer (14) was produced as in Example 1, except that a monomer mixture (B-14) containing MMA (81 parts by weight), BA (9 parts by weight), and t-DM (0.003 parts by weight) (only the amount of t-DM was smaller than that in Example 1) was used instead of the monomer mixture (B-1) in Example 1. (Meth)acrylic polymer particles in the latex had a volume average particle diameter of 0.210 µm. Further, a (meth)acrylic polymer powder was produced as in Example 1 using the latex of the (meth)acrylic polymer (14), and subjected to the same tests as in Example 1.

Example 15

A latex of a (meth)acrylic polymer (15) was produced as in Example 1, except that a monomer mixture (B-15) containing MMA (81 parts by weight) and BA (9 parts by weight) and not containing t-DM was used instead of the monomer mixture (B-1) in Example 1. (Meth)acrylic polymer particles in the latex had a volume average particle diameter of 0.210 µm. Further, a (meth)acrylic polymer powder was produced as in Example 1 using the latex of the (meth)acrylic polymer (15), and subjected to the same tests as in Example 1.

Example 16

Water (140 parts by weight), sodium dodecylbenzenesulfonate (0.05 parts by weight), sodium sulfate (0.1 parts by weight), and sodium carbonate (0.05 parts by weight) were mixed, and the reactor was purged with nitrogen at 80° C. Then, potassium persulfate (0.0024 parts by weight) was added to the mixture, and subsequently a monomer mixture (A-14-a) containing MMA (3.5 parts by weight), BA (1.5 parts by weight), and t-DM (0.09 parts by weight) was continuously added thereto under stirring over 10 minutes as part of a monomer mixture (A). After completion of the addition of the monomer mixture (A-14-a), the resultant mixture was stirred for 1.5 hours for polymerization. Further, a monomer mixture (A-14-b) containing MMA (3.5 parts by weight) and BA (1.5 parts by weight) was continuously added thereto over 30 minutes as the rest of the monomer mixture (A). The resulting mixture was stirred for 1.5 hours for polymerization. Then, sodium dodecylbenzenesulfonate (0.5 parts by weight) was added to the mixture. Subsequently, a monomer mixture (B-16) containing MMA (81 parts by weight) and BA (9 parts by weight) was continuously added to the mixture over 30 minutes as a monomer mixture (B), and the obtained mixture was stirred for 5 hours. Potassium persulfate (0.05 parts by weight) was added to the mixture. Then, the resulting mixture was stirred for 1 hour to complete the polymerization reaction, and thereby a latex of a (meth)acrylic polymer (16) was provided. Sodium dodecylbenzenesulfonate (0.5 parts by weight for each) was added 0.5 hours, 1 hour, and 1.5 hours after the start of the continuous addition of the monomer mixture (B-16). (Meth)acrylic polymer particles in the latex of the polymer (A-16) as the (meth)acrylic polymer (A) had a volume average particle diameter of 0.116 µm. In addition, (meth)acrylic polymer particles in the latex of the (meth)acrylic polymer (16) had a volume average particle diameter of 0.261 µm.

Further, a (meth)acrylic polymer powder was produced as in Example 1 using the latex of the (meth)acrylic polymer (16), and subjected to the same tests as in Example 1. This processability improver for foam molding contained 2.05% by weight of an emulsifier in a total amount of 100% by weight.

Comparative Example 1

A latex of a (meth)acrylic polymer (C1) was produced as in Example 4, except that a monomer mixture (A-C1-a) containing BA (90 parts by weight) and t-DM (0.7 parts by weight) and not containing MMA was used instead of the monomer mixture (A-4-a) in Example 4 and a monomer (A-C1-b) containing BA (10 parts by weight) and not containing MMA was used instead of the monomer mixture (A-4-b) in Example 4. (Meth)acrylic polymer particles in the latex of the polymer (A-C1) as the (meth)acrylic polymer (A) had a volume average particle diameter of 0.118 µm. (Meth)acrylic polymer particles in the latex of the (meth)acrylic polymer (C1) had a volume average particle diameter of 0.261 µm. A (meth)acrylic polymer powder was produced as Example 1 using the latex of the (meth)acrylic polymer (C1), and subjected to the same tests as in Example 1.

Comparative Example 2

A latex of a (meth)acrylic polymer (C2) was produced as in Example 1, except that a monomer mixture (B-C2) containing MMA (45 parts by weight), BA (45 parts by weight), and t-DM (0.007 parts by weight) was used as the monomer mixture (B) in Example 1. (Meth)acrylic polymer particles in the latex had a volume average particle diameter of 0.209 µm. Further, a (meth)acrylic polymer powder was produced as in Example 1 using the latex of the (meth)acrylic polymer (C2), and subjected to the same tests as in Example 1.

Comparative Example 3

A latex of a (meth)acrylic polymer (C3) was produced as in Example 1, except that the latex of the polymer (A-1) was produced as in Example 1, then the latex of the polymer (A-1) (40 parts by weight, solid content) was used instead of the latex of the polymer (A-1) (10 parts by weight, solid content) in Example 1, and a monomer mixture (B-C3) containing MMA (54 parts by weight), BA (6 parts by weight), and t-DM (0.0047 parts by weight) was used as the monomer mixture (B) in Example 1. (Meth)acrylic polymer particles in the latex had a volume average particle diameter of 0.123 μm. Further, a (meth)acrylic polymer powder was produced as in Example 1 using the latex of the (meth)acrylic polymer (C3), and subjected to the same tests as in Example 1.

Comparative Example 4

A latex of a (meth)acrylic polymer (C4) was produced as in Example 1, except that a monomer mixture (A-C4-a) containing MMA (63 parts by weight) and BA (27 parts by weight) and not containing t-DM was used instead of the monomer mixture (A-1-a) in Example 1. (Meth)acrylic polymer particles in the latex of the polymer (A-C4) as the (meth)acrylic polymer (A) had a volume average particle diameter of 0.840 μm. (Meth)acrylic polymer particles in the latex had a volume average particle diameter of 0.192 μm. Further, a (meth) acrylic polymer powder was produced as in Example 1 using the latex of the (meth)acrylic polymer (C4), and subjected to the same tests as in Example 1.

Comparative Example 5

A latex of a (meth)acrylic polymer (C5) was produced as in Example 1, except that a monomer mixture (B-C5) containing MMA (81 parts by weight), BA (9 parts by weight), and t-DM (0.02 parts by weight) (only the amount of t-DM was larger than that in Example 1) was used instead of the monomer mixture (B-1) in Example 1. (Meth)acrylic polymer particles in the latex of the (meth)acrylic polymer (C5) had a volume average particle diameter of 0.209 μm. Further, a (meth)acrylic polymer powder was produced as in Example 1 using the latex of the (meth)acrylic polymer (C5), and subjected to the same tests as in Example 1.

Comparative Example 6

Water (140 parts by weight), sodium dodecylbenzenesulfonate (0.05 parts by weight), sodium sulfate (0.1 parts by weight), and sodium carbonate (0.05 parts by weight) were mixed, and the reactor was purged with nitrogen at 70° C. Then, added to the mixture over 30 minutes were potassium persulfate (0.005 parts by weight), and subsequently, under stirring, a monomer mixture (B-C6) as a monomer mixture (B), which included MMA (90 parts by weight), BA (10 parts by weight), and t-DM (0.0078 parts by weight). The resulting mixture was stirred for 5 hours to complete the polymerization reaction, and thereby a latex of a (meth)acrylic polymer (C6) was produced. Sodium dodecylbenzenesulfonate (0.5 parts by weight for each) was added 0.5 hours, 1 hour and 3 hours after the start of the continuous addition of the monomer mixture (B-C6). (Meth)acrylic polymer particles in the latex had a volume average particle diameter of 0.211 μm.

Further, a (meth)acrylic polymer powder was produced as in Example 1 using the latex of the (meth)acrylic polymer (C6), and subjected to the same tests as in Example 1. This processability improver for foam molding contained 1.55% by weight of an emulsifier in a total amount of 100% by weight.

Comparative Example 7

A vinyl chloride resin composition was produced as in Example 1, except that it did not contain the (meth)acrylic polymer powder used in Example 1. The vinyl chloride resin composition was subjected to the same tests as in Example 1.

Comparative Example 8

A vinyl chloride resin composition was produced as in Example 1, except that 40 parts by weight of the (meth)acrylic polymer powder was used. The vinyl chloride resin composition was subjected to the same tests as in Example 1.

TABLE 1

| | Monomer mixture (A) | | Monomer mixture (B) | | Molecular weight | | Surface quality | Specific gravity (g/cm3) | Gelling properties (min:sec) |
| | | | | | Copolymer (A) | Copolymer (B) | | | |
| | Composition (% by weight) | Parts | Composition (% by weight) | Parts | | | | | |
|---|---|---|---|---|---|---|---|---|---|
| Example 1 | MMA70/BA30/t-DM0.78 | 10 | MMA90/BA10/t-DM0.0078 | 90 | 68,000 | 3,850,000 | 5 | 0.66 | 3:53 |
| Example 2 | MMA90/BA10/t-DM0.78 | 10 | MMA90/BA10/t-DM0.0078 | 90 | 60,000 | 3,820,000 | 5 | 0.67 | 4:14 |
| Example 3 | MMA55/BA45/t-DM0.78 | 10 | MMA90/BA10/t-DM0.0078 | 90 | 80,000 | 3,720,000 | 4 | 0.67 | 4:01 |
| Example 4 | MMA20/BA80/t-DM0.78 | 10 | MMA90/BA10/t-DM0.0078 | 90 | 92,000 | 3,800,000 | 3 | 0.68 | 4:10 |
| Example 5 | MMA70/BA30/t-DM0.78 | 10 | MMA95/BA5/t-DM0.0078 | 90 | 68,000 | 3,800,000 | 5 | 0.66 | 4:11 |
| Example 6 | MMA70/BA30/t-DM0.78 | 10 | MMA82/BA18/t-DM0.0078 | 90 | 68,000 | 3,800,000 | 5 | 0.71 | 2:19 |
| Example 7 | MMA70/BA30/t-DM0.78 | 10 | MMA75/BA25/t-DM0.0078 | 90 | 68,000 | 3,780,000 | 4 | 0.75 | 1:48 |
| Example 8 | MMA70/BA30/t-DM0.78 | 5 | MMA90/BA10/t-DM0.0078 | 95 | 68,000 | 3,630,000 | 5 | 0.62 | 3:45 |
| Example 9 | MMA70/BA30/t-DM0.78 | 20 | MMA90/BA10/t-DM0.0078 | 80 | 68,000 | 3,600,000 | 5 | 0.72 | 2:42 |
| Example 10 | MMA70/BA30/t-DM0.44 | 10 | MMA90/BA10/t-DM0.0078 | 90 | 200,000 | 3,720,000 | 4 | 0.67 | 3:40 |
| Example 11 | MMA70/BA30/t-DM0.22 | 10 | MMA90/BA10/t-DM0.0078 | 90 | 280,000 | 3,720,000 | 3 | 0.69 | 3:21 |
| Example 12 | MMA70/BA30/t-DM0.78 | 10 | MMA90/BA10/t-DM0.011 | 90 | 68,000 | 2,900,000 | 5 | 0.69 | 3:46 |
| Example 13 | MMA70/BA30/t-DM0.78 | 10 | MMA90/BA10/t-DM0.017 | 90 | 68,000 | 2,450,000 | 5 | 0.72 | 3:38 |
| Example 14 | MMA70/BA30/t-DM0.78 | 10 | MMA90/BA10/t-DM0.0033 | 90 | 68,000 | 4,500,000 | 4 | 0.62 | 4:02 |
| Example 15 | MMA70/BA30/t-DM0.78 | 10 | MMA90/BA10 | 90 | 68,000 | 5,500,000 | 3 | 0.59 | 4:15 |
| Example 16 | MMA70/BA30/t-DM3.3 | 10 | MMA90/BA10/t-DM0.0078 | 90 | 100,000 | 3,890,000 | 5 | 0.67 | 3:50 |
| Comparative Example 1 | BA100/t-DM0.78 | 10 | MMA90/BA10/t-DM0.0078 | 90 | 82,000 | 3,800,000 | 2 | 0.71 | 4:58 |
| Comparative Example 2 | MMA70/BA30/t-DM0.78 | 10 | MMA50/BA50/t-DM0.0078 | 90 | 68,000 | 3,980,000 | 3 | 0.80 | 0:58 |
| Comparative Example 3 | MMA70/BA30/t-DM0.78 | 40 | MMA90/BA10/t-DM0.0078 | 60 | 68,000 | 3,620,000 | 4 | 0.78 | 1:55 |
| Comparative Example 4 | MMA70/BA30 | 10 | MMA90/BA10/t-DM0.0078 | 90 | 1,750,000 | 3,720,000 | 2 | 0.78 | 4:20 |
| Comparative Example 5 | MMA70/BA30/t-DM0.78 | 10 | MMA90/BA10/t-DM0.022 | 90 | 68,000 | 1,500,000 | 4 | 0.83 | 3:10 |

TABLE 1-continued

|  | Monomer mixture (A) | | Monomer mixture (B) | | Molecular weight | | Surface quality | Specific gravity (g/cm3) | Gelling properties (min:sec) |
|---|---|---|---|---|---|---|---|---|---|
|  | Composition (% by weight) | Parts | Composition (% by weight) | Parts | Copolymer (A) | Copolymer (B) | | | |
| Comparative Example 6 | — | — | MMA90/BA10/t-DM0.0078 | 100 | — | 3,800,000 | 2 | 0.78 | 4:54 |
| Comparative Example 7 | — | — | — | — | — | — | 5 | 1.38 | 10:00> |
| Comparative Example 8 | MMA70/BA30/t-DM0.78 | 10 | MMA90/BA10/t-DM0.0078 | 90 | 68,000 | 3,850,000 | 1 | 0.85 | 0:29 |

The results in Table 1 show that the molded products excellent in surface quality and specific gravity were produced in Examples 1 to 16.

The results of Examples 1 to 4 and Comparative Example 1 show that in the case that the (meth)acrylic polymer (A) in the (meth)acrylic polymer contained methyl methacrylate in an amount of less than 10% by weight, the surface quality and gelling properties of the molded product were poor. In contrast, in the case that the (meth)acrylic polymer (A) contained methyl methacrylate in an amount within the range specified herein, the surface quality, the specific gravity, and gelling properties of the molded product were excellent.

The results of Examples 1 and 5 to 7 and Comparative Example 2 show that in the case that the (meth)acrylic polymer (B) in the (meth)acrylic polymer contained methyl methacrylate in an amount of less than 75% by weight, the specific gravity was poor. In contrast, in the case that the (meth)acrylic polymer (B) contained methyl methacrylate in an amount within the range specified herein, the surface quality, the specific gravity, and gelling properties of the molded product were excellent.

The results of Examples 1, 8 and 9, and Comparative Examples 3 and 6 show that in the case that the (meth)acrylic polymer contained the (meth)acrylic polymer (A) in an amount of less than 1 part by weight, the surface quality and the specific gravity of the molded product were poor; and in the case that the (meth)acrylic polymer contained the (meth)acrylic polymer (A) in an amount of more than 20 parts by weight, the specific gravity was poor. In contrast, in the case that the (meth)acrylic polymer contained the (meth)acrylic polymer (A) in an amount within the range specified herein, the surface quality, the specific gravity, and gelling properties of the molded product were excellent.

The results of Examples 1, 10 and 11, and Comparative Example 4 show that in the case that the (meth)acrylic polymer (A) in the (meth)acrylic polymer had a molecular weight of more than 300,000, the surface quality and the specific gravity of a molded product were poor. In contrast, in the case that the (meth)acrylic polymer (A) had a molecular weight within the range specified herein, the surface quality, the specific gravity, and gelling properties of the molded product were excellent.

The results of Examples 1 and 12 to 15, and Comparative Example 5 show that in the case that the (meth)acrylic polymer (B) or an equivalent (meth)acrylic polymer had a molecular weight of less than 2,500,000, the specific gravity was poor. In contrast, in the case that the (meth)acrylic polymer had a molecular weight within the range specified herein, the surface quality, the specific gravity, and gelling properties of the molded product were excellent.

The results of Examples 1 and 16 show that even in the case that a latex of the (meth)acrylic polymer (A) in the (meth) acrylic polymer was formed by emulsion polymerization, and thereafter the monomer mixture (B) was added dropwise to the latex for polymerization, the surface quality, the specific gravity, and gelling properties of the molded product were excellent.

The results of Examples 1, and Comparative Examples 7 and 8 show that in the case that the amount of the (meth) acrylic polymer was more than 30 parts by weight with respect to 100 parts by weight of the vinyl chloride resin, the surface quality and the specific gravity of the molded product were poor. In contrast, in the case that the amount of the (meth)acrylic polymer blended into the vinyl chloride resin was less than 1 part by weight, the specific gravity and gelling properties were poor. In contrast, in the case that the weight parts of the (meth)acrylic polymer was within the range specified herein with respect to 100 parts by weight of the vinyl chloride resin, the surface quality, the specific gravity, and gelling properties of the molded product were excellent.

Examples 17 and 18

A latex of (meth)acrylic polymer particles having the composition shown in Table 2 was produced as in Example 1, and ion exchange water was added to the latex to give a solid concentration of 15%. Thereafter, a 2.5% calcium chloride aqueous solution (4 parts by weight, solid content) was added to 100 parts by weight of the polymer particles, whereby a solid slurry was produced. Further, water was added to the solid slurry to give a solid concentration of 12%. The produced solid slurry was heated to 95° C., and held at 95° C. for 2 minutes. Then, the solid slurry was cooled to 50° C. and dehydrated, washed with water five times as much as the resin amount, and thereafter dried, whereby a (meth)acrylic polymer powder was produced as a processability improver for foam molding. The (meth)acrylic polymer powder was evaluated as in Example 1. Table 2 shows both results.

TABLE 2

|  | Monomer mixture (A) | | Monomer mixture (B) | | Molecular weight | | Specific gravity (g/cm3) |
|---|---|---|---|---|---|---|---|
|  | Composition (% by weight) | Parts | Composition (% by weight) | Parts | Copolymer (A) | Copolymer (B) | |
| Example 17 | MMA50/BA50/t-DM2.0 | 5 | MMA95/BA5/TAIC0.0001 | 95 | 25,000 | 5,250,000 | 0.56 |
| Example 18 | MMA50/BA50/t-DM2.0 | 10 | MMA95/BA5/TAIC0.0001 | 90 | 25,000 | 5,140,000 | 0.57 |

The results of Examples 17 and 18 compared with Example 1 show that in the composition of the (meth)acrylic polymer (A), reduction in the amount of MMA and increase in the amount of BA lead to softening of the (meth)acrylic polymer (A), and increase in the amount of t-DM leads to a lower molecular weight of the (meth)acrylic polymer (A); in the composition of the (meth)acrylic polymer (B), increase in the amount of MMA and reduction in the amount of BA lead to hardening of the (meth)acrylic polymer (B), no use of t-DM leads to a higher molecular weight of the (meth)acrylic polymer (B), and use of TAIC allows the (meth)acrylic polymer (B) to be a polymer having a branch point; whereby a foam having a specific gravity lower than that of a foam of the vinyl chloride resin composition of Example 1 can be produced.

The invention claimed is:

1. A processability improver for foam molding, comprising:
  a (meth)acrylic polymer powder with a weight average molecular weight of 2,000,000 to 7,000,000,
  wherein the (meth)acrylic polymer powder comprises 1 to 20% by weight of a (meth)acrylic polymer (A) with a weight average molecular weight of 10,000 to 300,000, and 80 to 99% by weight of a (meth)acrylic polymer (B) with a weight average molecular weight of greater than 2,000,000 to 7,000,000, and
  the (meth)acrylic polymer powder comprises a primary particle having a multilayer structure, and the primary particle comprises an inner layer containing the (meth)acrylic polymer (A) and an outer layer containing the (meth)acrylic polymer (B).

2. The processability improver for foam molding according to claim 1,
  wherein the (meth)acrylic polymer is obtained by emulsion polymerization of 75 to 100% by weight of methyl methacrylate, 0 to 25% by weight of a (meth)acrylic ester other than the methyl methacrylate, and 0 to 5% by weight of other monomers copolymerizable with the methyl methacrylate and the (meth)acrylic ester.

3. The processability improver for foam molding according to claim 2,
  wherein the (meth)acrylic polymer (B) is obtained by emulsion polymerization of a monomer mixture (B), the monomer mixture (B) comprising 75 to 100% by weight of methyl methacrylate, 0 to 25% by weight of a (meth)acrylic ester other than the methyl methacrylate, and 0 to 5% by weight of other monomers copolymerizable with the methyl methacrylate and the (meth)acrylic ester.

4. The processability improver for foam molding according to claim 2,
  wherein the (meth)acrylic polymer (B) is obtained by emulsion polymerization of a monomer mixture (B), the monomer mixture (B) comprising 75 to 99.999999% by weight of methyl methacrylate, 0 to 25% by weight of a (meth)acrylic ester other than the methyl methacrylate, and 0.000001 to 0.01% by weight (0.01 to 100 ppm by weight) of a multifunctional monomer.

5. The processability improver for foam molding according to claim 2,
  wherein the (meth)acrylic polymer (A) is obtained by emulsion polymerization of a monomer mixture (A), the monomer mixture (A) comprising 10 to 100% by weight of methyl methacrylate, 0 to 90% by weight of a (meth)acrylic ester other than the methyl methacrylate, and 0 to 5% by weight of other monomers copolymerizable with the methyl methacrylate and the (meth)acrylic ester.

6. The processability improver for foam molding according to claim 2,
  which is obtained by emulsion polymerization of 80 to 99 parts by weight of the monomer mixture (B) in the presence of a latex of the (meth)acrylic polymer (A) obtained by emulsion polymerization of 1 to 20 parts by weight of the monomer mixture (A).

7. The processability improver for foam molding according to claim 6,
  wherein an emulsifier to be used in the emulsion polymerization is one or more salts selected from the group consisting of alkylbenzene sulfonates, alkyldiphenyl ether disulfonates and alkyl sarcosinates.

8. The processability improver for foam molding according to claim 6, further comprising
  0.2 to 4.0% by weight of the emulsifier based on 100% by weight of the processability improver for foam molding.

9. The processability improver for foam molding according to claim 6,
  wherein the (meth)acrylic polymer powder has a volume average particle diameter of 50 to 300 μm, and
  a particle in the powder is a porous aggregate formed by fusion sticking of primary particles having a volume average primary particle diameter of 0.12 to 0.70 μm in an immature-melt state at a position contacting with each other.

10. The processability improver for foam molding according to claim 9,
  wherein the (meth)acrylic polymer powder is obtained by spray-drying a polymer latex obtained by the emulsion polymerization.

11. A vinyl chloride resin composition, comprising:
  100 parts by weight of a vinyl chloride resin; and
  1 to 30 parts by weight of the processability improver for foam molding comprising: a (meth)acrylic polymer powder with a weight average molecular weight of 2,000,000 to 7,000,000, wherein the (meth)acrylic polymer powder comprises 1 to 20% by weight of a (meth)acrylic polymer (A) with a weight average molecular weight of 10,000 to 300,000, and 80 to 99% by weight of a (meth)acrylic polymer (B) with a weight average molecular weight of greater than 2,000,000 to 7,000,000, and the (meth)acrylic polymer powder comprises a primary particle having a multilayer structure, and the primary particle comprises an inner layer containing the (meth)acrylic polymer (A) and an outer layer containing the (meth)acrylic polymer (B).

\* \* \* \* \*